(12) United States Patent
MacDougall

(10) Patent No.: US 7,107,131 B2
(45) Date of Patent: Sep. 12, 2006

(54) CROSS-ENGINE AIRCRAFT COMMUNICATION SYSTEM

(75) Inventor: James MacDougall, Scottsdale, AZ (US)

(73) Assignee: Honeywell International, Inc., Morristown, NJ (US)

( * ) Notice: Subject to any disclaimer, the term of this patent is extended or adjusted under 35 U.S.C. 154(b) by 281 days.

(21) Appl. No.: 10/794,662

(22) Filed: Mar. 5, 2004

(65) Prior Publication Data

US 2005/0197750 A1    Sep. 8, 2005

(51) Int. Cl.
*B64C 23/00* (2006.01)
*G01C 1/00* (2006.01)
(52) U.S. Cl. .............................. 701/3; 701/13; 701/33; 244/158.1; 477/20
(58) Field of Classification Search .................... 701/3, 701/13, 33; 244/158.1; 477/17, 20
See application file for complete search history.

(56) References Cited

U.S. PATENT DOCUMENTS

| | | | |
|---|---|---|---|
| 3,930,366 A | 1/1976 | Nelson | |
| 4,551,972 A | 11/1985 | Lewis | |
| 4,644,744 A | 2/1987 | Mittendorf et al. | |
| 5,136,841 A | 8/1992 | Zimmerman | |
| 5,165,240 A | 11/1992 | Page et al. | |
| 5,522,026 A | 5/1996 | Records et al. | |
| 6,438,481 B1 * | 8/2002 | Carpenter et al. | ............ 701/70 |

* cited by examiner

Primary Examiner—Gertrude A. Jeanglaude
(74) Attorney, Agent, or Firm—Ingrassia Fisher & Lorenz

(57) ABSTRACT

The invention provides methods, systems, and products for communicating between engine computers without the participation of a flight deck computer. The invention allows the engine computers to coordinate activities for real-time control of the engines for improved efficiency using an existing ARINC 429 communications bus. The invention facilitates cross-engine communications over the same ARINC 429 communications bus used for communicating with the Flight Deck Computer, without installation of a second, dedicated communications bus for cross-engine communications. The invention thus provides a cost effective way to allow the engines to coordinate activities without expensive installation and recertification of airframe modifications.

32 Claims, 2 Drawing Sheets

CROSS-ENGINE AIRCRAFT COMMUNICATION SYSTEM

BACKGROUND OF THE INVENTION

The present invention generally relates to avionics systems in commercial and military aircraft, and more specifically, to bus communications methods and systems for cooperatively sending information between embedded computers each controlling individual engines within an airframe.

Modern turbine engines are complicated devices requiring computer control to maintain their peak efficiency of operation. Data about their environment must be fed to these turbine engines and their operating parameters must be precisely adjusted in a coordinated manner. A pilot uses flight deck controls, such as throttles, to direct the operation of these turbine engines, and these directions must be communicated to computers associated with the engine to provide a coordinated change of operating variables within permissible envelopes. Modern aircraft employ a flight deck computer to serve as a communications hub for receiving the manual control inputs received from the numerous manual controls in the cockpit, determining which flight instrument is to receive the input, formatting a message with information regarding the manual input, and sending the message to the flight instrument. The engine computers are normally one of many such flight instruments on an aircraft. The engine computers in turn send status and acknowledgement messages back to the flight deck computer for displaying status and values of flight parameters.

The ARINC 429 bus is typically used for such communications. The ARINC 429 protocol was originally promulgated by Aeronautical Radio, Incorporated (ARINC) for airborne data communication between instruments and employs a unidirectional transmission of 32 bit words (messages) over two wire twisted pairs. Each word contains five fields, one of which is a message identifier, or label, identifying the data type and the parameters associated with it.

When two or more engines are carried on the airframe, each engine computer must not only interact with the flight deck computer, but it must also interact with other engine computers. Not only must the operating variables within each engine be coordinated internally, but the changes in one engine must be coordinated with the other engines as well. One problematic scenario is the situation in which one engine goes out and the others must compensate for the change in bleed air requirements and thrust. If the remaining engines are not adjusted, then they may also fail through overheating. Normally the pilot would provide control over the engines but some things may be controlled between the engines without pilot intervention.

One solution for a multi-engine aircraft involves establishing a second cross-engine communication bus dedicated for communications between the engine computers and programming the engine computers to exchange information over the communication bus. This solution allows the engine computers to communicate with each other without involvement from the flight deck computer over the ARINC 429 bus. Without such a dedicated communications bus, the pilot must manually perform the coordination activities between the engines or the coordination task must be accomplished within the flight deck computer. In general, the vendor of the flight deck computer is not necessarily the same as the vendor of the engine computers, and neither party necessarily has the expertise to support the other in this regard.

U.S. Pat. No. 5,165,240 shows a configuration of a full authority digital engine control, or FADEC, serving as an engine computer for each of two engines. The left and right FADECs communicate with each other via a RS-422 bus (36, FIG. 2), and each receives inputs from their respective engine sensors and autopilots (24L, 24R, FIG. 2), and sends display information to a common engine indication emergency crew alerting system (EICAS) (28L, 28R, FIG. 2). A first ARINC 429 communications bus provides communications with the engine sensors, and a second ARINC 429 communications bus, which may be the same as the first ARINC 429 communications bus, also provides communications with the EICAS.

U.S. Pat. No. 5,136,841 describes such an engine-to-engine communication setup, where an optical bus is provided for allowing two engine electronic control units (engine computers) to communicate with one another (FIG. 1), replacing the standard isolation station coupled with each engine electronic control unit to provide electrically isolated engine-to-engine communications. The optical couplers to an optical bus provide the necessary electrical isolation instead of the standard ARINC 429 connection. This configuration implements a special dedicated communications bus (88A, 88B, 90A, 90B) between the two engine control units (12, 14).

However, some business jets do not have existing cross-engine communication buses wired into the aircraft, which prevents engine-to-engine sharing of important data. To retrofit such a cross-engine communication bus into an existing airframe would require major maintenance and incur significant cost in terms of installation, testing, updates of schematic diagrams, new documentation, and recertification of the aircraft. Furthermore, significant aircraft downtime would be required in order to add this ability to an existing aircraft configuration.

As can be seen, there is a need for a method and apparatus to support engine-to-engine communications in an airframe in which there is no dedicated bus installed between engines. Such a capability should be relatively inexpensive and capable of implementation without excessive aircraft downtime.

SUMMARY OF THE INVENTION

In one aspect of the present invention, a method of cross-engine communications is provided for an airframe with a plurality of engines, each engine having an engine computer, the engine computers communicating with a flight deck computer through a communications bus, where method comprises the steps of identifying a set of engine parameters to be shared between the engines; assigning a transmit identifier and a receive identifier for a selected engine parameter, the selected engine parameter chosen from the set of engine parameters; enabling each engine computer to transmit a message containing the selected engine parameter and identified by the transmit identifier assigned to the selected engine parameter; and enabling each engine computer to receive the message containing the selected engine parameter and identified by a receive identifier assigned to the selected engine parameter.

In another aspect of the invention, a method of cross-engine communication in an airframe is provided where the airframe includes a first engine and a second engine, the first engine having a first engine computer communicating with a digital acquisition unit through a first communications bus, the second engine having a second engine computer communicating with the digital acquisition unit through a second communications bus, the digital acquisition unit communicating with a flight deck computer through a third communications bus, wherein messages are exchanged between the flight deck computer and the first and second engine computers through the digital acquisition unit through the first, second, and third communications busses. The method comprises the steps of identifying a set of engine parameters to be shared between the first engine and the second engine; assigning a transmit identifier and a receive identifier for a selected engine parameter, the selected engine parameter chosen from the set of engine parameters; enabling each engine computer to transmit a message containing the selected engine parameter and identified by the transmit identifier assigned to the selected engine parameter; enabling each engine computer to receive the message containing the selected engine parameter and identified by the receive identifier assigned to the selected engine parameter; and enabling the digital acquisition unit to identify the message containing the selected engine parameter that is received on the second communications bus and resubmitting the message onto the first communications bus for reception by the first engine computer.

In another aspect of the invention, a method of implementing a cross-engine communication system an existing airframe is provided for an airframe having a plurality of engines, each engine having an engine computer in communication with a digital acquisition unit over an engine communications bus associated with the engine, the digital acquisition unit communicating with a flight deck computer through a flight deck computer communications bus, and the engine computers having no dedicated communications bus directly connecting the engine computers. The method comprises the steps of identifying a set of engine parameters to be shared between the engines; assigning a transmit identifier and a receive identifier for a selected engine parameter, the selected engine parameter chosen from the set of engine parameters; enabling each engine computer to transmit to the digital acquisition unit over the engine communications bus connecting the engine computer to the digital acquisition unit a message containing the selected engine parameter and identified by the transmit identifier assigned to the selected engine parameter; enabling each engine computer to receive from the digital acquisition unit over the engine communications bus connecting the engine computer to the digital acquisition unit, the message containing the selected engine parameter and identified by a receive identifier assigned to the selected engine parameter; and enabling the digital acquisition unit to receive the message and transmit the message over the engine communications bus of a selected engine computer other than the engine computer sending the message without transmitting the message to the flight deck computer.

In another aspect of the invention, a computer program product for use on a first engine computer is provided, the computer program product comprising a computer useable medium and a computer readable code embodied on the computer useable medium for causing the transmission and reception of a message, the computer readable code comprising the following: computer readable program code instructions configured to cause an engine parameter from a first engine computer to be transmitted to a second engine computer over a communications bus between the first engine computer and the second engine computer, the communications bus with a set of assigned identifiers and a set of non-assigned identifiers, the engine parameter being associated with a transmit identifier and a receive identifier chosen from the set of non-assigned identifiers; and computer readable program code instructions configured to cause an the engine parameter from the second engine computer to be received by the first engine computer over the communications bus.

In another aspect of the invention, a computer program product is provided for use on a digital acquisition unit communicating with a first engine computer through a first communications bus and a second engine computer through a second communications bus, the computer program product comprising a computer useable medium and a computer readable code embodied on the computer useable medium for causing messages to be exchanged between the first and second communications busses. The computer readable code comprises the following: computer readable program code instructions configured to cause an engine parameter from a first engine computer to be transmitted to a second engine computer over a communications bus between the first engine computer and the second engine computer, the communications bus with a set of assigned identifiers and a set of non-assigned identifiers, the engine parameter being associated with a transmit identifier and a receive identifier chosen from the set of non-assigned identifiers; and computer readable program code instructions configured to cause an the engine parameter from the second engine computer to be received by the first engine computer over the communications bus.

In still another aspect of the invention, a cross-engine communications system for use on an airframe with a first engine and a second engine is provided, the system comprising a first engine computer controlling the first engine, a second engine computer controlling the second engine; a digital acquisition unit having a first communications bus between the first engine computer and the digital acquisition unit, the digital acquisition unit further having a second communications bus between the second engine computer and the digital acquisition unit, the digital acquisition unit further having a third communications bus between the digital acquisition unit and a flight deck computer; a first set of messages for transmission between the flight deck computer and at least one of the engine computers; a second set of messages for transmission between the first engine computer and the second engine computer; the digital acquisition unit configured to receive from the first communications bus a first message from the first set transmitted by the first engine computer and to transmit the first message on the second communications bus to the second engine computer, wherein the first message is not transmitted on the third communications bus; the digital acquisition unit configured to receive from the second communications bus a second message from the first set transmitted by the second engine computer and to transmit the second message on the first communications bus to the first engine computer, wherein the second message is not transmitted on the third communications bus; the digital acquisition unit configured to receive from the third communications bus a third message from the second set and to transmit the third message on either the first communications bus or the second communications bus; and the digital acquisition unit configured to receive from either the first communications bus or the second communications bus a fourth message from the second set and to transmit the fourth message on the third communications bus to the flight deck computer.

These and other features, aspects, and advantages of the present invention will become better understood with reference to the following drawings, description, and claims.

DETAILED DESCRIPTION OF THE INVENTION

The following detailed description is of the best currently contemplated modes of carrying out the invention. The description is not to be taken in a limiting sense, but is made merely for illustrating the general principles of the invention, since the scope of the invention is best defined by the appended claims.

Broadly, the invention provides a method and apparatus for communicating between engine computers without the participation of a flight deck computer. The present invention allows the engine computers to coordinate activities for real-time control of the engines for improved efficiency. Heretofore, the engines would receive manual commands from the pilot through the flight deck computer and provide status information to the flight deck computer, both supported by a communications bus. Often a dedicated communications bus would be provided exclusively for communications between the engine computers, where the message set exchanged over the dedicated communications bus was unique to that bus and different from the message set exchanged between the engine computers and the flight deck computer. The present invention facilitates cross-engine communications over the same communications bus without installation of a second, dedicated communications bus for cross-engine communications. The present invention thus provides a cost effective way to allow the engines to coordinate activities without expensive installation and recertification of airframe modifications.

Figure 1:
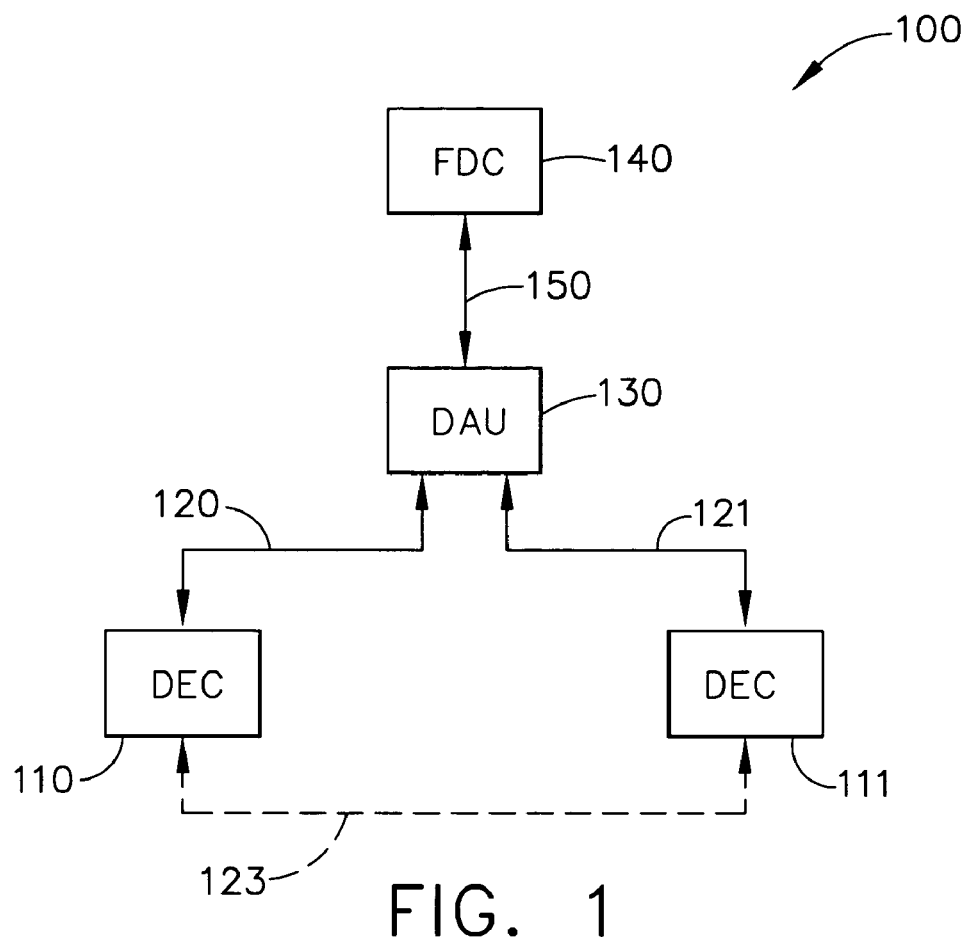
FIG. 1 shows a schematic diagram of a communications bus setup for communications between engine computers and a flight deck computer, according to an embodiment of the invention.

Referring to FIG. 1, a configuration 100 is shown for a two-engine airframe, within which the invention might be implemented. The configuration may comprise a flight deck computer (FDC) 140 and two digital engine computers (DEC) 110, 111, one assigned to each of two engine modules mounted on the airframe. A digital acquisition unit 130, or DAU, may be provided to collect information from each of the two digital engine computers 110,111. DEC 110 may be connected to the DAU 130 with a communications bus 120, while DEC 111 may be independently connected to the DAU 130 by a second communications bus 121. The DAU 130 may functionally provide electrical isolation between the two DECs 110,111 and between the DECs and the FDC 140. The DAU 130 may also serve to remove messages from each of the two communication busses 120, 121 and reinsert the messages onto communications bus 150, which connects the DAU 130 to the FDC 140. The DAU 130 may also receive messages from the FDC 140, determine to which digital engine computer the messages are being sent, and insert the messages upon the appropriate communications bus 120, 121.

In configuration 100, an ARINC 429 communications bus structure and protocol may be used for engine-to-avionics communications, i.e. for communications bus 120 and 121. The ARINC 429 protocol is an industry standard for data communications between airborne instrumentation and is hereby incorporated by reference in its entirety. Communications bus 150 may generally be configured according to other protocols known to the art, but in some cases may also be configured according to the ARINC 429 protocol. Avionics communications bus 150 may allow engine commands to be transmitted from the FDC 140 to the DAU 130. The DAU 130 may then resubmit the message to all of the engines on the communications bus, where the message may be identified by an ARINC Engine Receive Label. The DECs 110, 111 may send data back to the FDC by a similar exchange.

In some airframes, a dedicated communications bus 123 may also be provided so that the DECs 110, 111 may exchange messages for coordinating activities of the two engine modules. This dedicated communications bus 123 may be implemented using various standard protocols, such as RS-422 or ARINC 429, or using a unique protocol known only to the DECs 110, 111. The ARINC 429 communications bus 120, 121 is not normally used for cross-engine communications.

Figure 2:
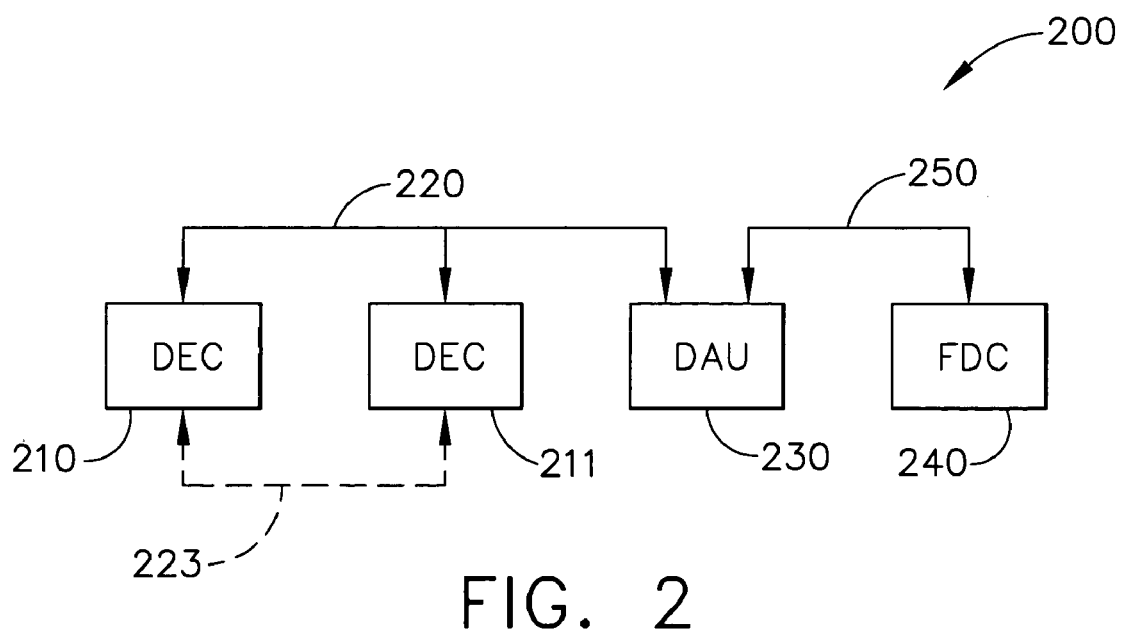
FIG. 2 shows a schematic diagram of another communications bus setup for communications between engine computers and a flight deck computer, according to another embodiment of the invention.

Another variation of configuration 100 is shown as configuration 200 in FIG. 2. Configuration 200 shows a single communications bus 220, upon which the DECs 210, 211 are daisy-chained to the DAU 230. The DAU 230 may be connected to the FDC 240 through a separate communications bus 250. Again, there may also be a dedicated communications bus 223 providing cross-engine communications, but this dedicated communications bus 223 may not be present on all aircraft.

The method provided by the invention may involve modification to the programs in the DECs 110, 111 and the DAU 130 to exchange a set of messages between the DECs 110, 111 without interference with the FDC 140, and still be able to receive messages from and send messages to the FDC 140.

Figure 3:
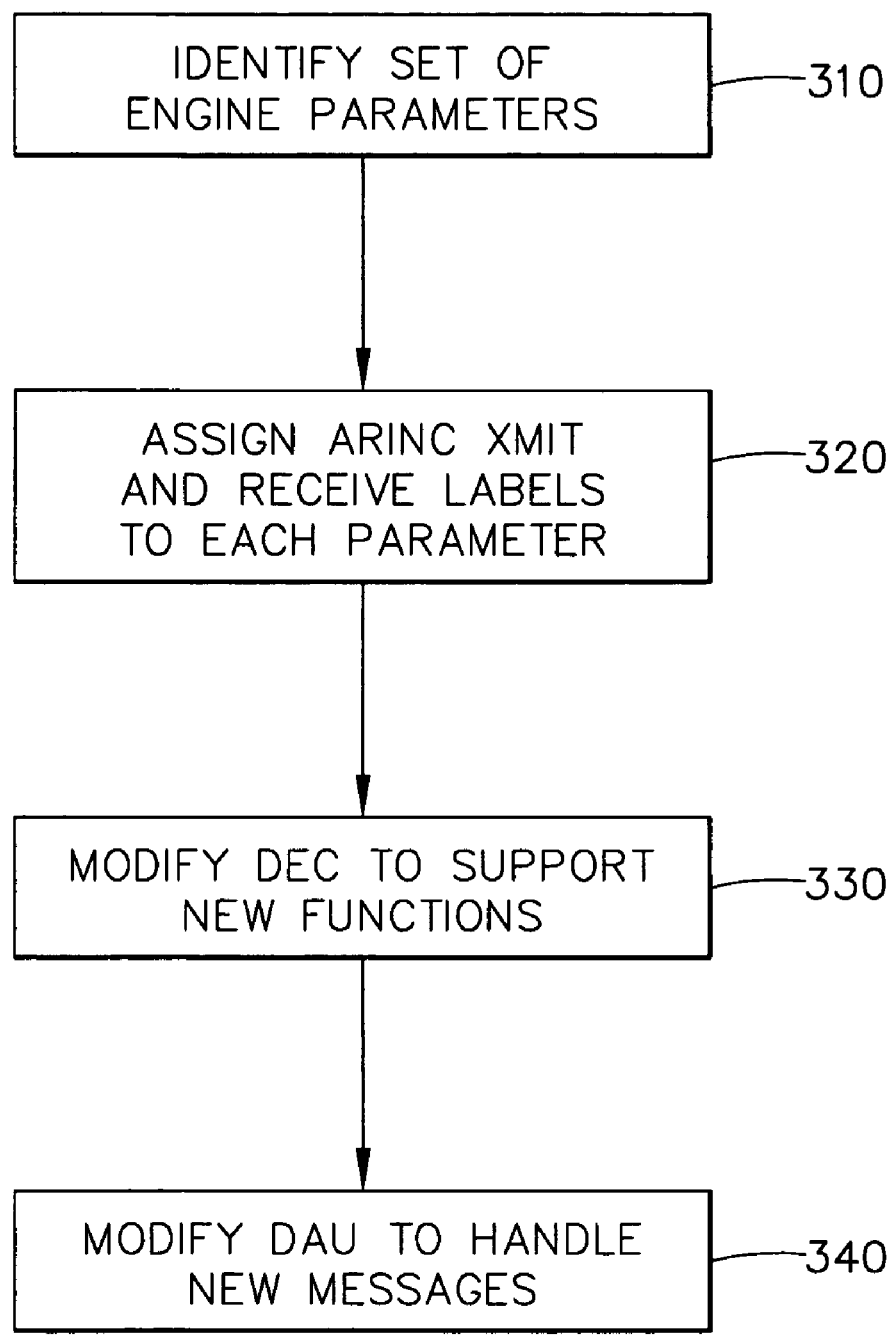
FIG. 3 shows a flowchart of a method for providing a communications path over existing hardware, according to an embodiment of the invention.

Referring now to FIG. 3, the first step in implementing this method may be an identification action, as indicated in box 310. According to this step, an engine function may be identified for implementation. For this engine function, a set of engine parameters may be identified that may describe the identified engine function, so that this set of engine parameters may be shared between all of the engines. For example, such engine functions may include, but not be limited to, any engine-out condition, engine anti-ice activation, wing anti-ice activation, or brake anti-ice activation, or any combination of these functions.

When the set of engine parameters is identified, then each engine parameter may be assigned a new ARINC message transmit and receive label (or bit on a existing label) to define a new message for exchanging the engine parameter, as indicated by box 320, such that each parameter has a designated bit within the message for both transmit and receive. A format for a field within the message may also be defined for this parameter so that all engines may scale and interpret the parameter in the same manner for consistent processing of the parameter by the engine computers. This new set of messages containing the transmit and receive labels may be chosen so that these labels do not duplicate other transmit and receive labels within the existing set of messages implemented on the hardware.

A DEC computer program that is executed on each DEC 110, 111 may be modified to support the new functions, as indicated by box 330. As part of such a modification, the computer program may recognize the new message labels for transmission and reception.

A DAU computer program that is executed on the DAU 130 may also be modified to recognize the new set of messages, as indicated by box 340, so that messages received on communications bus 120 from DEC 110 may be resubmitted to communications bus 121 for transmission to DEC 111. Similarly, messages received on communications bus 121 from DEC 111 may be resubmitted to communications bus 120 for transmission to DEC 110. Messages received on communications busses 120, 121 that are for the FDC 140 may be resubmitted to communications bus 150 in the standard manner. Similarly, messages received on communications bus 150 for either DEC 110, 111 may be identified and resubmitted to the appropriate communications bus 120, 121.

When the computer programs for the DAU 140 and DECs 110, 111 have been modified according to the method of the invention, according to boxes 330, 340, an engine-to-engine cross talk communication path may be provided for the Engine Control System for improved engine operation and performance. An engine may be capable of reacting in an appropriate manner to any condition affecting another engine.

For example, an engine-out condition in one engine may affect the performance of other engines carried by the airframe. Without cross-engine communication, when an engine stops operating, the other engine(s) will not be aware of the condition. Since any bleed air extraction requirements must be satisfied by the remaining operating engine(s), an overbleed condition could be created in the remaining operating engine(s) if they were not aware of the engine-out condition, thus forcing one or more of the remaining operating engines to run too hot. This overheating condition may create a possible temperature exceedance, which would lead to possible engine damage or reduction in power. If the cross-engine communication path is provided by the method of the invention, then in the event of an engine-out condition, the DECs associated with the remaining engine(s) could compensate by raising temperature limits such that exceedances and reductions in power did not occur.

It should be noted that although only examples involving two engines, each engine being controlled by a single engine computer, have been discussed, the invention may apply similarly to aircraft configurations having two or more engines without loss of generality. Using examples involving two engines facilitates ease of description of the invention and is not intended to be a limitation or restriction of the applicability of the invention to other multiple engine configurations. Specifically, the invention may apply to aircraft having two, three, or four engines. The invention may also apply to configurations in which a single engine computer may control multiple engines and the airframe may have two or more such multi-engine computers.

The invention may also be used in situations in which a dedicated communications bus is already in place for cross-engine communications and it is desired either to reduce weight of the airframe by eliminating the hardware supporting the dedicated communications bus or to simplify support requirements for supporting the software in the engine computers by removing the requirement for the second data communications protocol on the dedicated communications bus.

Thus, it may be seen that the cross-engine communications path provided by the invention may be advantageously used in aircraft that may lack a dedicated communications bus for cross-engine communications. Since existing ARINC 429 communications bus structures for communications between the DECs and the FDC may be utilized, then the method may be implemented exclusively through software changes in the DEC and DAU, thereby eliminating the cost and downtime that might be required to install a dedicated communications bus. In addition, by implementing the communications path exclusively through software changes, no additional weight is added to that of the aircraft, so that weight-balance charts for the aircraft operations do not have to be modified.

As will be appreciated by one of skill in the art, embodiments of the present invention may be provided as methods, systems, or computer program products. Accordingly, the present invention may take the form of an entirely hardware embodiment, an entirely software embodiment or an embodiment combining software and hardware aspects. Furthermore, the present invention may take the form of a computer program product which is embodied on one or more computer-usable storage media (including, but not limited to, disk storage, CD-ROM, optical storage, programmable read-only memory, and other storage media known in the art) having computer-usable program code embodied therein.

The present invention has also been described with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, embedded processor or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

It should be understood, of course, that the foregoing relates to preferred embodiments of the invention and that modifications may be made without departing from the spirit and scope of the invention as set forth in the following claims.

I claim:

1. A method of cross-engine communication in an airframe with a plurality of engines, each engine having an engine computer, the engine computers communicating with a flight deck computer through a first communications bus, the engine computers not communicating over a second communications bus, the method comprising identifying a set of engine parameters to be shared between the engines;

assigning a transmit identifier and a receive identifier for a selected engine parameter, the selected engine parameter chosen from the set of engine parameters;

enabling each engine computer to transmit over the first communications bus a message containing the selected engine parameter and identified by the transmit identifier assigned to the selected engine parameter; and enabling each engine computer to receive over the first communications bus the message containing the selected engine parameter and identified by a receive identifier assigned to the selected engine parameter.

2. The method described in claim 1, wherein the first communications bus is an ARINC 429 communications bus.

3. The method described in claim 1, wherein the step of enabling each engine computer to transmit the message containing the selected engine parameter comprises modifying computer software executing on the engine computer to transmit a message containing the selected engine parameter and identified by the transmit identifier assigned to the selected engine parameter.

4. The method described in claim 1, wherein the step of enabling each engine computer to receive the message containing the selected engine parameter comprises modifying computer software executing on the engine computer to receive a message containing the selected engine parameter and identified by the receive identifier assigned to the selected engine parameter.

5. A method of cross-engine communication in an airframe with a first engine and a second engine, the first engine having a first engine computer communicating with a digital acquisition unit through a first communications bus, the second engine having a second engine computer communicating with the digital acquisition unit through a second communications bus, the digital acquisition unit communicating with a flight deck computer through a third communications bus, wherein messages are exchanged between the flight deck computer and the first and second engine computers through the digital acquisition unit through the first, second, and third communications busses, the method comprising identifying a set of engine parameters to be shared between the first engine and the second engine;

assigning a transmit identifier and a receive identifier for a selected engine parameter, the selected engine parameter chosen from the set of engine parameters;

enabling each engine computer to transmit a message containing the selected engine parameter and identified by the transmit identifier assigned to the selected engine parameter;

enabling each engine computer to receive the message containing the selected engine parameter and identified by the receive identifier assigned to the selected engine parameter; and enabling the digital acquisition unit to identify the message containing the selected engine parameter that is received on the first communications bus and resubmitting the message onto the second communications bus for reception by the second engine computer; and enabling the digital acquisition unit to identify the message containing the selected engine parameter that is received on the second communications bus and resubmitting the message onto the first communications bus for reception by the first engine computer.

6. The method described in claim 5, wherein the first communications bus and the second communications bus are each an ARINC 429 communications bus.

7. The method described in claim 5, wherein the step of enabling the digital acquisition unit to identify the message containing the selected engine parameter that is received on the first communications bus and resubmitting the message onto the second communications bus for reception by the second engine computer comprises modifying computer software executing on the digital acquisition unit to identify the message containing the selected engine parameter that is received on the first communications bus and resubmitting the message onto the second communications bus for reception by the second engine computer.

8. The method described in claim 5, wherein the step of enabling the digital acquisition unit to identify the message containing the selected engine parameter that is received on the second communications bus and resubmitting the message onto the first communications bus for reception by the first engine computer comprises modifying computer software executing on the digital acquisition unit to identify the message containing the selected engine parameter that is received on the second communications bus and resubmitting the message onto the first communications bus for reception by the first engine computer.

9. A method of implementing a cross-engine communication system in an airframe with a plurality of engines, each engine having an engine computer in communication with a digital acquisition unit over an engine communications bus associated with the engine, the digital acquisition unit communicating with a flight deck computer through a flight deck computer communications bus, the engine computers having no dedicated communications bus directly connecting the engine computers, the method comprising identifying a set of engine parameters to be shared between the engines;

assigning a transmit identifier and a receive identifier for a selected engine parameter, the selected engine parameter chosen from the set of engine parameters;

enabling each engine computer to transmit to the digital acquisition unit over the engine communications bus connecting the engine computer to the digital acquisition unit a message containing the selected engine parameter and identified by the transmit identifier assigned to the selected engine parameter;

enabling each engine computer to receive from the digital acquisition unit over the engine communications bus connecting the engine computer to the digital acquisition unit, the message containing the selected engine parameter and identified by a receive identifier assigned to the selected engine parameter; and enabling the digital acquisition unit to receive the message and transmit the message over the engine communications bus of a selected engine computer other than the engine computer sending the message without transmitting the message to the flight deck computer.

10. The method of implementing a cross-engine communication system described in claim 9, wherein at least one engine communications bus is an ARINC 429 communications bus.

11. A computer program product for use on a first engine computer, the computer program product comprising a computer useable medium and a computer readable code embodied on the computer useable medium for causing the transmission and reception of a message, the computer readable code comprising:

computer readable program code instructions configured to cause an engine parameter from a first engine computer to be transmitted to a second engine computer over a communications bus between the first engine computer and the second engine computer, the communications bus with a set of assigned identifiers and a set of non-assigned identifiers, the engine parameter being associated with a transmit identifier and a receive identifier chosen from the set of non-assigned identifiers; and computer readable program code instructions configured to cause the engine parameter from the second engine computer to be received by the first engine computer over the communications bus.

12. The computer program product described in claim 11, wherein the computer program product is used by the second engine computer.

13. The computer program product described in claim 11, wherein the first and second engine computers are associated with aircraft engines contained in an airframe.

14. The computer program product described in claim 11, wherein the communications bus is an ARINC 429 communications bus.

15. The computer program product described in claim 14, wherein the transmit and receive identifiers are ARINC 429 transmit and receive labels, respectively.

16. The computer program product described in claim 11, wherein the computer useable medium is a programmable read-only memory.

17. A computer program product for use on a digital acquisition unit communicating with a first engine computer through a first communications bus and a second engine computer through a second communications bus, the computer program product comprising a computer useable medium and a compute readable code embodied on the computer useable medium for causing messages to be exchanged between the first and second communications busses, the computer readable code comprising:

computer readable program code instructions configured to cause an engine parameter from a first engine computer to be transmitted to a second engine computer over a communications bus between the first engine computer and the second engine computer, the communications bus with a set of assigned identifiers and a set of non-assigned identifiers, the engine parameter being associated with a transmit identifier and a receive identifier chosen from the set of non-assigned identifiers; and computer readable program code instructions configured to cause the engine parameter from the second engine computer to be received by the first engine computer over the communications bus.

18. The computer program product described in claim 17, wherein at least one of the first communications bus and the second communications bus is an ARINC 429 communications bus.

19. The computer program product described in claim 17, wherein the third communications bus is non-ARINC standard communications bus.

20. The computer program product described in claim 17, wherein there is no dedicated communications bus directly connecting the first engine computer with the second engine computer.

21. A cross-engine communications system for use on an airframe with a plurality of engine computers, each engine computer controlling a single engine, system comprising a digital acquisition unit having a first communications bus supporting communications between the plurality of engine computers and the digital acquisition unit, the digital acquisition unit further having a second communications bus between the digital acquisition unit and a flight deck computer;

a first set of messages for transmission between the flight deck computer and at least one of the plurality of engine computers;

a second set of messages for transmission between the plurality of engine computers;

the digital acquisition unit configured to receive from the first communications bus a first message from the first set transmitted by a selected engine computer from the plurality of engine computers and to transmit the first message on the second communications bus to at least one of the remaining engine computers in the plurality of engine computers, wherein the first message is not transmitted on the second communications bus;

the digital acquisition unit configured to receive from the third communications bus a third message from the second set and to transmit the third message on the second communications bus to one or more of the plurality of engine computers; and the digital acquisition unit configured to receive on the second communications bus from the selected engine computer in the plurality of engine computers a fourth message from the second set and to transmit the fourth message on the third communications bus to the flight deck computer.

22. The cross-engine communications system described in claim 21, wherein the plurality of engine computers comprises two engine computers.

23. The cross-engine communications system described in claim 21, wherein the plurality of engine computers comprises four engine computers.

24. The cross-engine communications system described in claim 21, wherein the first communications bus is an ARINC 429 communications bus.

25. The cross-engine communications system described in claim 21, wherein each engine computer of the plurality of engine computers has a separate ARINC 429 communications bus with the digital acquisition unit.

26. The cross-engine communications system described in claim 21, wherein the second communications bus is an ARINC 429 communications bus.

27. A cross-engine communications system for use on an airframe with a first engine and a second engine, the system comprising a first engine computer controlling the first engine;

a second engine computer controlling the second engine;

a digital acquisition unit having a first communications bus between the first engine computer and the digital acquisition unit, the digital acquisition unit further having a second communications bus between the second engine computer and the digital acquisition unit, the digital acquisition unit further having a third communications bus between the digital acquisition unit and a flight deck computer;

a first set of messages for transmission between the flight deck computer and at least one of the engine computers;

a second set of messages for transmission between the first engine computer and the second engine computer;

the digital acquisition unit configured to receive from the first communications bus a first message from the first set transmitted by the first engine computer and to transmit the first message on the second communications bus to the second engine computer, wherein the first message is not transmitted on the third communications bus;

the digital acquisition unit configured to receive from the second communications bus a second message from the first set transmitted by the second engine computer and to transmit the second message on the first communications bus to the first engine computer, wherein the second message is not transmitted on the third communications bus;

the digital acquisition unit configured to receive from the third communications bus a third message from the second set and to transmit the third message on either the first communications bus or the second communications bus; and the digital acquisition unit configured to receive from either the first communications bus or the second communications bus a fourth message from the second set and to transmit the fourth message on the third communications bus to the flight deck computer.

28. The cross-engine communications system described in claim 27, wherein at least one of the first communications bus and the second communications bus is an ARINC 429 communications bus.

29. The cross-engine communications system described in claim 27, wherein the third communications bus is a non-ARINC standard communications bus.

30. An aircraft operated by a pilot, the aircraft comprising a first engine controlled by a first engine computer;
a second engine controlled by a second engine computer;
a digital acquisition unit having a first communications bus between the first engine computer and the digital acquisition unit, the digital acquisition unit further having a second communications bus between the second engine computer and the digital acquisition unit;
a flight deck computer having a third communications bus between the flight deck computer and the digital acquisition unit, the flight deck computer receiving an engine-related command from the pilot and formatting the engine-related command as a first message selected from a first set of messages for transmission over the third communications bus to at least one of the engine computers; the flight deck computer additionally receiving an engine-related parameter over the third communications bus, the engine-related parameter contained in a second message chosen from the first set of messages;

a second set of messages for transmission between the first engine computer and the second engine computer;

the digital acquisition unit configured to receive from the first communications bus a third message selected from the second set of messages transmitted by the first engine computer and to transmit the third message on the second communications bus to the second engine computer, wherein the third message is not transmitted on the third communications bus;

the digital acquisition unit configured to receive from the second communications bus a fourth message selected from the second set transmitted by the second engine computer and to transmit the fourth message on the first communications bus to the first engine computer, wherein the fourth message is not transmitted on the third communications bus;

the digital acquisition unit configured to receive from the third communications bus the first message and to transmit the first message on either the first communications bus or the second communications bus; and the digital acquisition unit configured to receive from either the first communications bus or the second communications bus the second message and to transmit the second message on the third communications bus.

31. The aircraft described in claim 30, wherein at least one of the first communications bus and the second communications bus is an ARINC 429 communications bus.

32. The aircraft described in claim 30, wherein the third communications bus is a non-ARINC standard communications bus.

* * * * *